United States Patent
Okumura

[11] 4,068,921
[45] Jan. 17, 1978

[54] SCREEN ASSEMBLY
[75] Inventor: Shonosuke Okumura, Sakai, Japan
[73] Assignee: Os Screen Co., Ltd., Osaka, Japan
[21] Appl. No.: 711,374
[22] Filed: Aug. 3, 1976
[30] Foreign Application Priority Data

| Jan. 7, 1976 | Japan | 51-693[U] |
| Feb. 27, 1976 | Japan | 51-24171[U] |
| Feb. 27, 1976 | Japan | 51-24172[U] |

[51] Int. Cl.² .................. G03B 21/56; B42F 13/00
[52] U.S. Cl. ............................ 350/117; 160/24; 248/324
[58] Field of Search ............ 350/117; 248/324; 160/22, 24, 68, 70

[56] References Cited
U.S. PATENT DOCUMENTS

| 1,688,010 | 10/1928 | Godske | 160/22 X |
| 1,800,627 | 4/1931 | Heck | 160/24 |
| 2,395,303 | 2/1946 | Stableford | 160/24 |
| 2,479,812 | 8/1949 | Cechmanek | 160/24 |
| 3,362,671 | 1/1968 | Johnson | 248/324 |
| 3,592,255 | 7/1971 | Potter et al. | 160/24 |
| 3,750,995 | 8/1973 | Genger | 248/324 |
| 3,942,868 | 3/1976 | Hoffbauer et al. | 350/117 |

FOREIGN PATENT DOCUMENTS

| 1,026,479 | 3/1958 | Germany | 248/324 |

Primary Examiner—Donald A. Griffin
Attorney, Agent, or Firm—Wenderoth, Lind & Ponack

[57] ABSTRACT

A screen assembly for projecting an optical image thereon has a screen unit of a type including a screen casing, a winding spindle housed within the screen casing, a screen sheet having one end secured to the winding spindle and the other end situated outside the screen casing, and a screen winder for automatically retracting the screen sheet, once drawn out of the screen casing, into the screen casing, and a screen suspending and tilting mechanism. The screen suspending and tilting mechanism has a suspending column by which the screen casing is supported from an overhead supporting structure, and a tilt angle adjusting mechanism for tilting the screen sheet substantially about the longitudinal axis of the screen casing for the purpose of correcting a linear distortion which may otherwise occur in the projected image if the relative position of the projector and the screen is incorrect.

5 Claims, 11 Drawing Figures

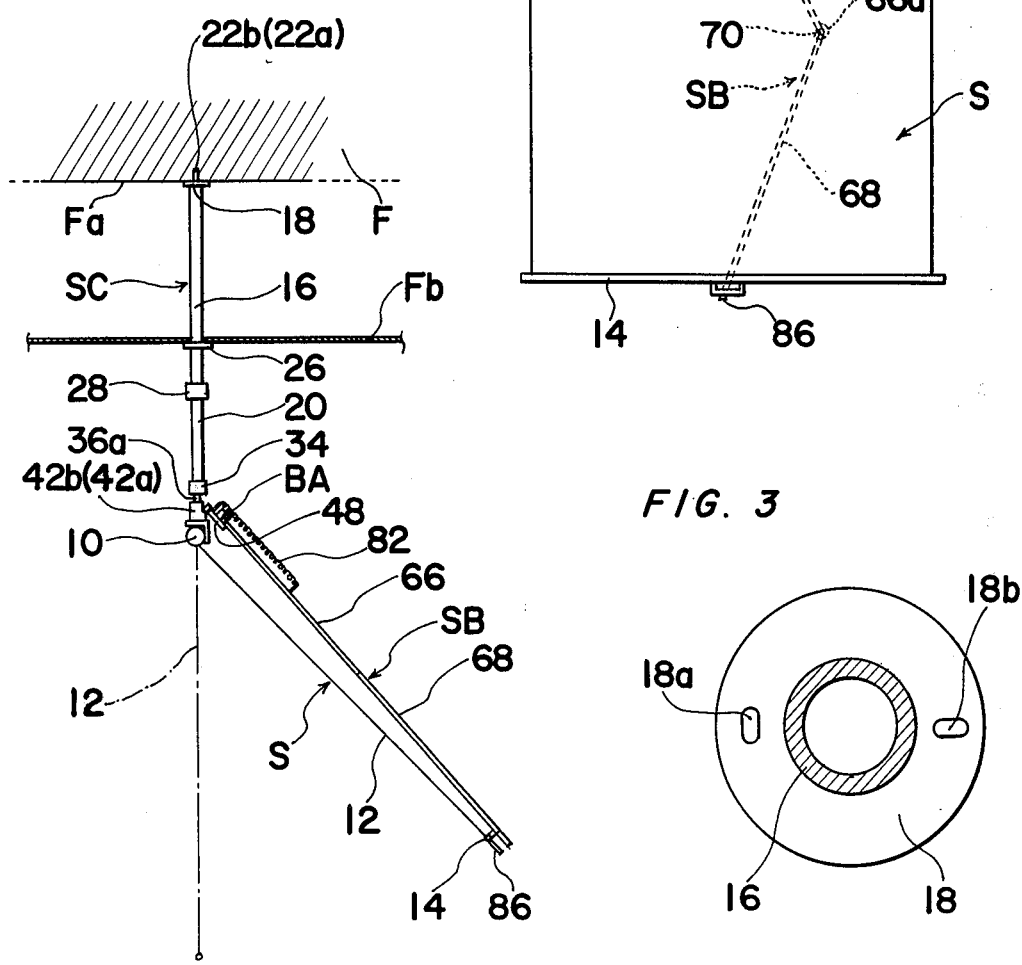

SCREEN ASSEMBLY

BACKGROUND OF THE INVENTION

The present invention generally relates to a screen assembly and, more particularly, to a screen suspending and tilting mechanism for suspending the screen from above and also for tilting the screen relative to the direction of travel of image carrying rays of light from an optical projector.

The term "projector" hereinabove and hereinafter employed is to be understood as meaning an optical instrument including a slide projector, a motion picture projector, an overhead projector and any other image projecting device used for the purpose of reproducing an image, either still or motion, on the screen.

Various types of screen assemblies are now commercially available and a recent version of them is known to comprise a cylindrical casing, a four-sided sheet of predetermined size having at least one surface adapted to have an optical image projected thereon, a spindle coaxially rotatably housed within the cylindrical casing and to which one side portion of the screen sheet is secured while the side portion opposed to the one side portion of the screen sheet is situated outside the cylindrical casing, and a screen winder employed, for example, in the form of at least one coil spring. The coil spring has the opposite ends respectively secured to the cylindrical casing and the spindle and is arranged to operate in such a manner that, while the screen sheet is drawn out of the cylindrical casing by the application of an external pulling force against the coil spring which at this time accumulates a winding force, the screen sheet once drawn out of the cylindrical casing can automatically be drawn into the casing upon release of the external pulling force by the effect of the accumulated winding force of the coil spring.

With the conventional screen assembly, it has often been experienced that, when an optical image is projected on the screen surface with the optical axis of, for example, a slide projector directed at a certain angle relative to the screen surface, that is, when the screen surface receives the projected image at an angle of incidence more or less than 90°, the projected image is reproduced in perspective due to linear distortion. This linear distortion can readily be substantially corrected if the angle of incidence of rays of light carrying the projected image is adjusted or set to be substantially at right angles to the screen surface. Heretofore, this has been carried out by tilting the projector up or down or by lifting or lowering either the projector or the screen relative to the other.

However, depending upon the circumstances, the correction of the linear distortion occurring in the projected image or picture on the screen surface cannot be achieved whatever the method therefor may be, because each of the above described methods of distortion correction requires a complicated and time-consuming procedure and a lot of labor which, to the mind of on-lookers, appears to be exaggerated.

In order to substantially eliminate the above described disadvantages and inconveniences, as disclosed in the Japanese Utility Model Publication (Unexamined) No. 67577/1974 laid open to public inspection on Dec. 22, 1975, I have invented a screen suspending and tilting mechanism. My prior screen suspending and tilting mechanism disclosed in the aforesaid publication comprises a screen assembly of any known construction having a screen sheet wound around a spindle within a screen casing, means for connecting the screen casing to an overhead supporting structure, for example, a ceiling of a room or hall, for rotation about an axis perpendicular to the plane of the overhead supporting structure and also to the longitudinal axis of the screen casing, and a tiltable support bar of telescopically extendable construction having a straight tube and a straight extension inserted in said straight tube for axial movement between retracted and projected positions. The means for connecting the screen casing to the overhead supporting structure includes a L-shaped bracket having a first flat portion, rotatably connected to the overhead supporting structure, and a second flat portion supporting the screen casing therebelow by means of a pair of suspending bars and to which one end of the straight tube remote from the straight extension is pivotally connected by way of an angle member. A free end of the straight extension remote from the straight tube has a fixture rigidly mounted thereon, to which fixture one side portion of the screen sheet situated outside the screen casing is, after the screen sheet has been drawn out of the casing, engaged in readiness for receiving the projected image or picture thereon. At this time, depending upon the size of the area of the screen sheet which is desired to have the picture projected thereon, the straight extension may be set either to the retracted position, or to the projected position or to a position intermediate the retracted and projected positions.

The tiltable support bar can be pivoted from a vertically oriented position selectively to any one of a plurality of tilted positions for adjustment of the angle of the screen sheet relative to the direction of travel of a beam of light from the projector. For this purpose, my prior screen suspending and tilting mechanism further comprises a tilt angle adjusting mechanism for selectively positioning the tiltable support bar to any one of the tilted positions. The tilt angle adjusting mechanism is constituted by an angular slot defined in the angle member and a stop which is in the form of a bolt and a nut, the bolt being inserted through the angular slot with the angle member situated between a head portion of the bolt and the nut fastened to said bolt. Since a portion adjacent the end of the straight tube, which is pivotally connected to the angle member and situated remote from the extension, of the tiltable support bar tending to assume a vertically downwardly oriented position under the influence of gravity force acting on said tiltable support bar, is engaged with the stop, adjustment of the position of the bolt relative to the angular slot results in positioning of the tiltable support bar to a selected one of the tilted positions and, consequently, the screen is swung backwards substantially around the screen casing.

My prior screen suspending and tilting mechanism of the construction described above has been developed on the basis of the fact, where the projector, for example, an overhead projector, cannot be tilted up or down and/or cannot be lifted or lowered relative to the screen during an attempt to correct the linear distortion occurring in the projected picture, the only way to correct it is to tilt the screen. With the above described screen suspending and tilting mechanism, tilting of the screen sheet can readily be achieved merely by positioning the tiltable support bar to any selected one of the tilted positions since that side portion of the screen sheet remote from the screen casing is engaged with the fixture on the tiltable support bar with said screen held in a position drawn out of the screen casing.

Although my prior screen suspending and tilting mechanism operates satisfactorily and conveniently, some disadvantages have been found which are attributable to the position and construction of the tilt angle adjusting mechanism. By way of example, since the bolt and the nut, which constitute the tilt angle adjusting mechanism, are positioned adjacent the overhead supporting structure and spaced a greater distance from the ground or floor than the largest possible height of the user of the screen assembly, frequent adjustment of the tilt angle of the screen sheet to suit to a particular situation in which the screen and the projector are placed is often hampered.

In addition thereto, after the screen sheet once drawn out of the screen casing has been retracted into the screen casing and even though the straight extension of the tiltable supporting bar is retracted into the straight tube, a substantial length of the straight tube remains suspended in the air within the room or hall, tending to provide an obstruction which would impair the appearance of the room or hall.

SUMMARY OF THE INVENTION

Accordingly, the present invention is directed to an improvement over my prior screen assembly and, particularly, the screen suspending and tilting mechanism, which substantially eliminates the disadvantages and inconveniences inherent not only in the conventional screen assemblies, but also in my prior screen assembly.

According to the present invention, the tiltable support bar pivotable for adjustment of the tilt angle of the screen sheet is substantially articulated having upper and lower rods pivotally connected to each other on one hand and the tilt angle adjusting mechanism makes use of a clutch. While the upper and lower support rods are associated such that, as the screen sheet is drawn out of the screen casing, the upper and lower support rods are brought into substantial line with each other, one end of the upper support rod remote from the lower support rod is so operatively associated with the clutch that the tiltable support bar can be pivoted to any selected one of the tilted positions stepwise merely by the application of an external pushing force. The upper and lower support rods of the tiltable support bar, which have been brought into substantial line with each other can automatically be folded when the screen sheet is desired to be retracted into the screen casing.

BRIEF DESCRIPTION OF THE DRAWINGS

These and other objects and features characteristic of the present invention will readily become apparent from the following description taken in conjunction with a preferred embodiment thereof with reference to the accompanying drawings, in which:

FIG. 1 is a schematic front elevational view of a screen assembly according to the present invention;

FIG. 2 is a schematic side elevational view of the screen assembly of FIG. 1;

FIG. 3 is a longitudinal sectional view, on an enlarged scale, of one end of a screen suspending column having a telescopically extendable construction;

DETAILED DESCRIPTION OF THE INVENTION

Figure 4:
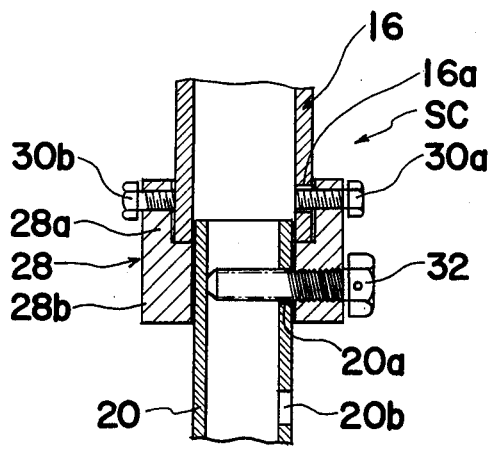
FIG. 4 is a longitudinal sectional view, on an enlarged scale, showing a connection between upper and lower tubes of the screen suspending column.

Before the description of the present invention proceeds, it is to be noted that like parts are designated by like reference numerals throughout the accompanying drawings.

Referring to FIG. 1, a screen assembly embodying my invention includes a screen unit, generally indicated by S. The screen unit S may be of any known construction and, however, in the instance thus far illustrated, is shown to comprise a hollow screen casing 10 of, for example, circular cross section, having a winding spindle (not shown) coaxially housed within the screen casing 10 and a spring loaded winder (not shown) operatively associated with the winding spindle, and a screen sheet 12 having one end rigidly secured to the winding spindle within the screen casing 10 and the other end situated outside the screen casing 10 and secured to, or otherwise rolled around, a frame rod 14, it being understood that the spring loaded winder within the screen casing is so designed as to permit the screen sheet 12, if drawn out of the screen casing 10, to be automatically retracted into the screen casing 12, taken up by the winding spindle so biased by said spring The screen assembly further includes a suspending column SC for supporting the screen unit S from an overhead support structure which is, in the illustrated embodiment, shown to be comprised of the underside Fa of the floor F above and an overhead wainscoting Fb situated beneath and spaced a distance from the underside Fa of the floor above. The suspending column SC comprises an upper tube 16, having a mounting flange 18 integral with one end of said upper tube 16, and a lower tube 20 telescopically adjustably inserted into the upper tube 16.

The mounting flange 18 is shaped as best shown in FIG. 3 and has a pair of opposed slots 18a and 18b disposed thereon so as to extend at right angles to each other. This perpendicular arrangement of the slots 18a and 18b on the mounting flange 18 is advantageous in that, after a pair of bolts 22a and 22b have been tapped, or otherwise embedded, into the floor F above from the underside Fa thereof in spaced relation to each other as shown in FIG. 1, and when the upper tube 16 of the suspending column SC is to be secured to the underside Fa with the slots 18a and 18b receiving the associated bolts 22a and 22b therethrough, alignment of the slots 18a and 18b relative to the associated bolts 22a and 22b can readily be performed. After this alignment has been done with the slots 18a and 18b on the mounting flange 18 receiving the associated bolts 22a and 22b therethrough, nuts 24a and 24b are respectively fastened to said bolts 22a and 22b whereby the upper tube 16 is connected to the underside Fa of the floor above.

A portion adjacent the other end of the upper tube 16 remote from the mounting flange 18 extends through a hole defined in the overhead wainscoting Fb and any possible clearance, which may exist in the overhead wainscoting Fb because of a difference between the outer diameter of the upper tube 16 and the size of the hole defined in the overhead wainscoting Fb, can advantageously be closed by the use of an annular blind patch 26 of, for example, the clip-on type.

The upper tube 16 and the lower tube 20 of an outer diameter substantially equal to or slightly smaller than the inner diameter of the upper tube 16 are telescopically movably connected to each other in a manner as best shown in FIG. 4. With particular reference to FIG. 4, a coupling sleeve 28 having a flange portion 28a, with an inner diameter substantially equal to or slightly greater than the outer diameter of the upper tube 16, and a guide portion 28b integral with said flange portion 28a and with an inner diameter preferably equal to the inner diameter of the upper tube 16 is detachably mounted on the upper tube 16 with said flange portion 28a receiving therein one end of said upper tube 16 opposed to the mounting flange 18. While the coupling sleeve 28 is mounted on the upper tube 16 in the manner described above, at least two bolt members 30a and 30b are employed to avoid any possible separation of the sleeve 28 from the upper tube 16.

As best shown in FIG. 4, the bolt member 30a adjustably extends through the flange portion 28a and then loosely through a hole 16a defined in the upper tube 16 and having a diameter greater than the maximum outer diameter of a threaded portion of the bolt member 30a, whereas the bolt member 30b adjustably extends through the flange portion 28a and terminates in pressing contact with upper tube 16.

A portion adjacent one end of the lower tube 20 remote from the screen unit S has a plurality of holes, two of which are shown by 20a and 20b, spaced a predetermined distance from each other in a direction parallel to the longitudinal axis of the lower tube 20, and that portion of the lower tube 20 is slidably inserted into the upper tube 16 through the guide portion 28b of the coupling sleeve 28 on one hand and, on the other hand, an adjustment bolt 32 adjustably extends through the guide portion 28a and then loosely through one of the holes 20a and 20b, for example, the hole 20a as shown, and terminates in pressing contact with a portion of the annular wall of the lower tuble 20 opposed to the hole 20a. It will readily be seen that the total length of the suspending column SC can be adjusted merely by removing the adjustment bolt *32* and then inserting it again so as to extend through any one of the holes 20a and 20b.

It is to be noted that, without the employment of the coupling sleeve 28, the upper and lower tubes 16 and 20 can telescopically adjustably be connected to each other by the use of at least one bolt member extending through the annular wall of the upper tube 16 and then through the annular wall of the lower tube 20 which is inserted into the upper tube. Moreover, even if the coupling sleeve 28 is employed as shown, instead of the use of the bolt members 30a and 30b, the flange portion 28a may be rigidly secured to the upper tube by means of, for example, welding.

However, the employment of the bolt members 30a and 30b in the manner as hereinbefore described in advantageous in that, even though the bolt member 30a after having adjustably extended through the annular wall of the upper tube 16 loosely extends through the hole 16a in the upper tube 16, the end of the upper tube 16 can firmly be held in position within the axial bore of the flange portion 28a because the bolt member 30b terminating in pressing contact with the annular wall of the upper tube 16 prevents the end of the upper tube 16 from loosely moving in a lateral direction. Similarly, the adjustment bolt 32 having the one end opposed to its head portion held in pressing contact with the inside wall of the lower tube 20 prevents the end of the lower tube 20 from moving in a lateral direction even though any one of the holes 20a and 20b has a diameter greater than the maximum outer diameter of the threaded portion of the bolt 32.

Figure 5:
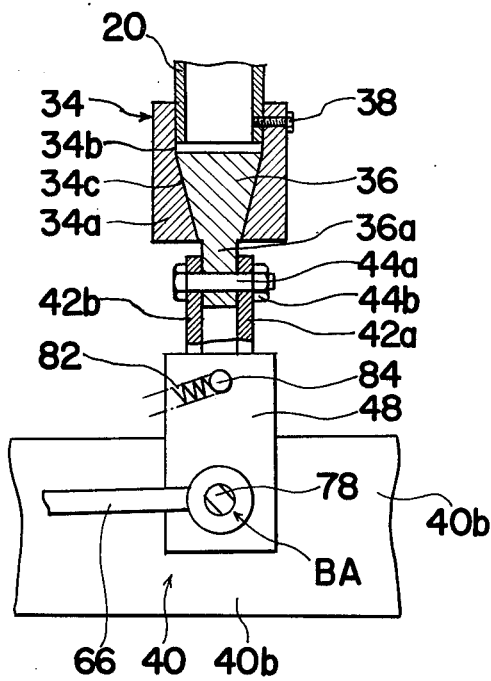
FIG. 5 is a longitudinal sectional view, on an enlarged scale, showing a rotatable and pivotal connection between the screen suspending column and a screen casing.

The other end of the lower tube 20 remote from the upper tube 16 has, as best shown in FIG. 5, a rotary joint assembly generally indicated by 34. The rotary joint assembly 34 comprises a suspending block 34a having a cylindrical bore 34b, which receives therein the other end of the lower tube 20 remote from the upper tube 16, and a downwardly tapered bore 34c, and a pendent portion 36 of substantially inverted conical shape and of being complemental in shape to the shape of the downwardly tapered bore 34c. The pendant portion 36 has a projection 36a integral with a lower end of the pendent portion 36 from the lower tube 20 and is housed within the downwardly tapered bore 34c for rotary movement about the longitudinal axis of the lower tube 20 with said projection 36a situated outside the suspending block 34 and downwardly extending in a direction opposite to the lower tube 20.

It is to be noted that, although the lower tube 20 and the suspending block 34 may be rigidly connected to each other by means, of for example, welding or screw engagement, a set bolt 38 is employed in the embodiment as shown to connect the suspending block 34 to that end of the lower tube 20. The number of the set bolts 38 need not be always limited to one, but two or more set bolts 38 may be employed.

Figure 6:
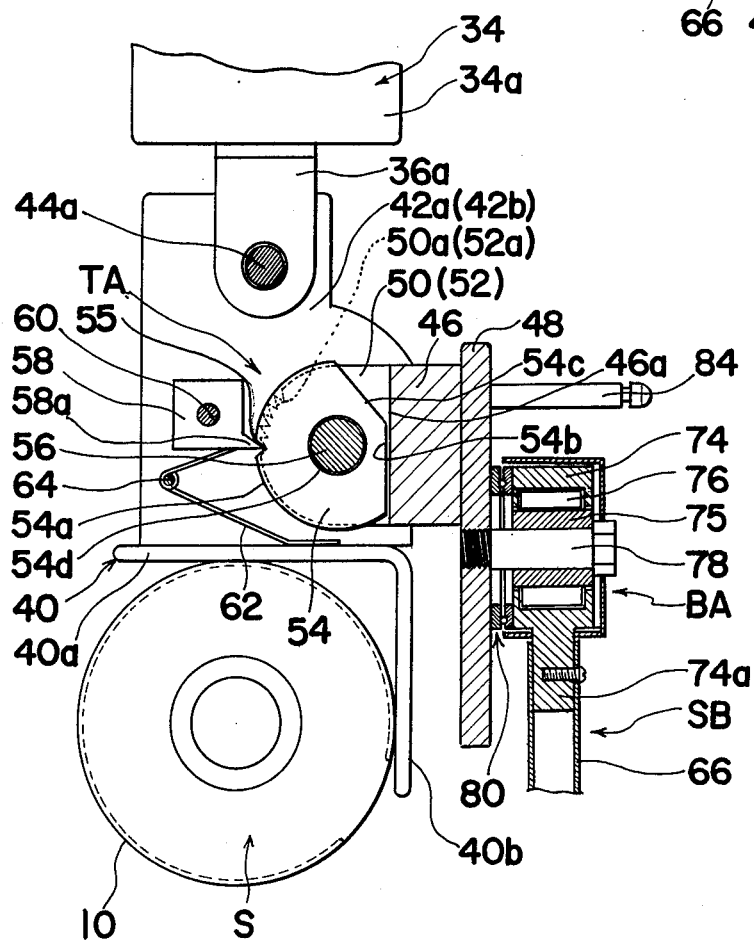
FIG. 6 is a side sectional view, on a further enlarged scale, showing the details of a tilt angle adjusting mechanism together with a pivotal connection between a tiltable plate and one end of a tiltable support bar.

As best shown in FIGS. 5 and 6, the projection 36a carries the screen unit S in a manner as will now be described.

Referring particularly to FIGS. 5 and 6, a substantially L-shaped bracket 40 having flat portions 40a and 40b at right angles to each other is secured to the screen casing 10 at a position intermediate of the length of the screen casing 10 with said flat portions 40a and 40b respectively held in contact with portions of the outer peripheral surface of the screen casing which are spaced about 90° about the longitudinal axis of the screen casing. Rigid connection between the L-shaped bracket 40 and the screen casing 10 may be effected by means of, for example, spot welding or by the use of a plurality of set screws.

Rigidly mounted on, or otherwise integrally formed with, the flat portion 40a of the bracket 40 are a pair of spaced upright frame members 42a and 42b of the same construction which are pivotally connected to the projection 36a by means of a bolt 44a and a nut 44b fastened to said bolt 44a, a substantially intermediate portion of said bolt 44a extending from the upright frame member 42b to the upright frame member 42a through the projection 36a. When the upright frame members 42a and 42b are so connected to the projection 36a, the former firmly clamp the latter.

In the construction so far described, it is clear that the screen unit S can be suspended from the overhead support structure by means of the suspending column SC. By adjusting the total length of the suspending column SC in the manner described above, the height of the screen unit S above a floor within the room or hall can be adjusted. Moreover, because of the particular construction of the rotary joint assembly 34, the direction in which the screen sheet 12 faces when drawn out of the screen casing 10 can be varied as desired.

However, it is to be noted that, where the overhead wainscoting Fb has a sufficient strength necessary to support the screen assembly therebelow, the upper tube 16 of the suspending column SC need not be secured to the underside Fa of the floor above, but may be secured to the overhead wainscoting Fb. In such case, the total length of the suspending column SC with the lower tube 20 fully extended from the upper tube 16 may be smaller than that where the upper tube 16 is secured to the underside of the floor above such as shown in FIGS. 1 and 2.

Moreover, where the adjustment of the total length of the suspending column SC is not necessary or desired, the upper tube 16 and the coupling sleeve 28 may be omitted in which case the lower tube 20 must be secured to either the underside Fa or the overhead wainscoting Fb in a manner similar to the connection of the upper tube 16 to the overhead support structure or any other method known to those skilled in the art.

Figure 7:
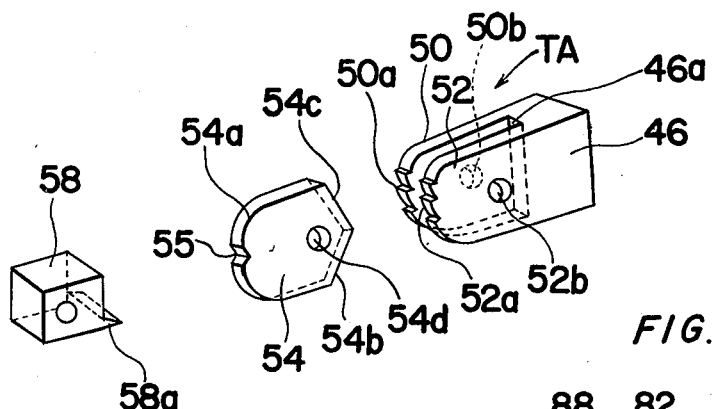
FIG. 7 is an exploded view of a clutch employed in the tilt angle adjusting mechanism shown in detail in FIG. 6.

Referring now to FIGS. 6 and 7, a tilt angle adjusting mechanism TA is a substantially housed within a space defined between the upright frame members 42a and 42b. This tilt angle adjusting mechanism Ta comprises a block 46 having one end secured to, or otherwise integrally formed with, a tiltable plate 48 of substantially rectangular shape and the other has integrally formed thereon a pair of spaced arms 50 and 52 projecting therefrom in a direction opposite to the tiltable plate 48. Each of the arms 50 and 52 is outwardly rounded at its free end remote from the tiltable plate 48, the rounded ends of said arms 50 and 52 having therein a series of saw teeth generally indicated by 50a and 52a, respectively. These arms 50 and 52 have respective bearing holes 50b and 52b coaxial with each other, the center of each of said bearing holes 50b and 52b being coincident with the center of curvature of the outwardly rounded end of the associated arm 50 or 52.

Operatively housed within a space defined between the arms 50 and 52 is a substantially segmentally shaped clutch plate 54 having a substantially semi-circular peripheral portion 54a and a pair of peripheral flanks 54b and 54c of the same size. This clutch plate 54 has a bearing hole 54d defined therein, the center of said bearing hole 54d coinciding with the center of curvature of the semi-circular peripheral portion 54a. It is, however, to be noted that the radius of curvature of the semi-circular portion 54a must be at least slightly greater than the radius of curvature of the rounded end of each of the arms 50 and 52 so that, when the arms 50 and 52 and the clutch plate 54 are supported in position in a manner as subsequently described, the semi-circular periphery of the clutch plate 54 will project slightly outwardly from the rounded ends of the arms 50 and 52, for a purpose which will become clear from the subsequent description.

As best shown in FIG. 7, the semi-circular peripheral portion 54a of the clutch plate 54 has therein a notch 55, the function of which will become apparent from the subsequent description.

The block 46 and the clutch plate 54 are both independently rotatably carried by the upright frame members 42a and 42b by means of a common shaft 56 having the opposite ends respectively journalled to the upright frame members 42a and 42b, a substantially intermediate portion of said common shaft 56 extending through the bearing holes 50b, 54d and 52b, with the clutch plate 54 situated within the space between the arms 50 and 52.

The flanks 54b and 54c in the clutch plate 54 are so arranged and so shaped that, when the block 46 and the clutch plate 54 are supported on the shaft 56 in the manner as hereinbefore described, an area 46a of the end face of the block 46 opposite to the end face integral with or secured to the tiltable plate 48, which area 46a is defined on said end face of the block 46 between the arms 50 and 52, alternately contacts the flanks 54b and 54c as the block 46 and, therefore, the tiltable plate 48, is pivoted about the shaft 56.

Referring still to FIGS. 6 and 7, the tilt angle adjusting mechanism TA further comprises a latch member 58 shown as having a cubic body having a latch engagement 58a engageable with the notch 55 in the clutch plate 54 and also with any one of the sawteeth 50a and 52a on the respective rounded ends of the arms 50 and 52. This latch member 58 is pivotally mounted on a shaft 60, having both ends journalled to the upright frame members 42a and 42b, with the latch engagement 58a engaged with the notch 55 and one of the sawteeth of each series 50a and 52a, and is biased in one direction, for example, counterclockwise, by a wire spring 62 having one end resting on the flat portion 40a of the L-shaped bracket 40 and the other end engaged with said latch member 58, a substantially intermediate portion of said wire spring 62 being coiled and mounted on a support pin 64 which is mounted on one or both of the upright frame members 42a and 42b.

While the tilt angle adjusting mechanism is constructed in the manner as hereinbefore described, the position of the sawteeth on the arms 50 and 52 and of the notch 55 in the clutch plate 54 relative to the position of the latch member 58, particularly, the latch engagement 58a, should be so selected that, when the latch engagement 58a is engaged with the notch 55 in the clutch plate 54, the flank 54b of the clutch plate 54 assumes a position parallel to the vertical datum and, consequently, the tiltable plate 48 contacting the flank 54b through the end face area 46a of the block 46 assumes a vertically downwardly oriented position as shown in FIG. 6.

The operation of the tilt angle adjusting mechanism TA will now be described with particular reference to FIGS. 6, 9, 10 and 11.

Assuming that the various components of the tilt angle adjusting mechanism TA are positioned as shown in FIG. 6, and if an external pulling or pushing force is transmitted, in a manner as will be described later, to the tiltable plate 48 so as to cause the latter to pivot counterclockwise about the common shaft 56, the sawteeth 50a and 52a on the respective rounded ends of the arms 50 and 52 stepwisely ride over the latch engagement 58a. Each time the sawteeth 50a and 52a successively ride over the latch engagement 58a, the latch member 58 is pivoted clockwise about the shaft 60 against the wire spring 62 with the latch engagement 58a engaging the sawteeth 50a and 52a one after another. At this time, the clutch plate 54 does not substantially rotate about the shaft 56 because of the difference between the radius of curvature of the semi-circular peripheral portion 54a of the clutch plate 54 and that of each of the rounded ends of the respective arms 50 and 52 on one hand and because the size of the notch 55 in the clutch plate 54 so selected as to accommodate the movement of the latch engagement 58a which takes place each time the sawteeth 50a and 52a ride over the latch engagement 58a.

Figure 9:
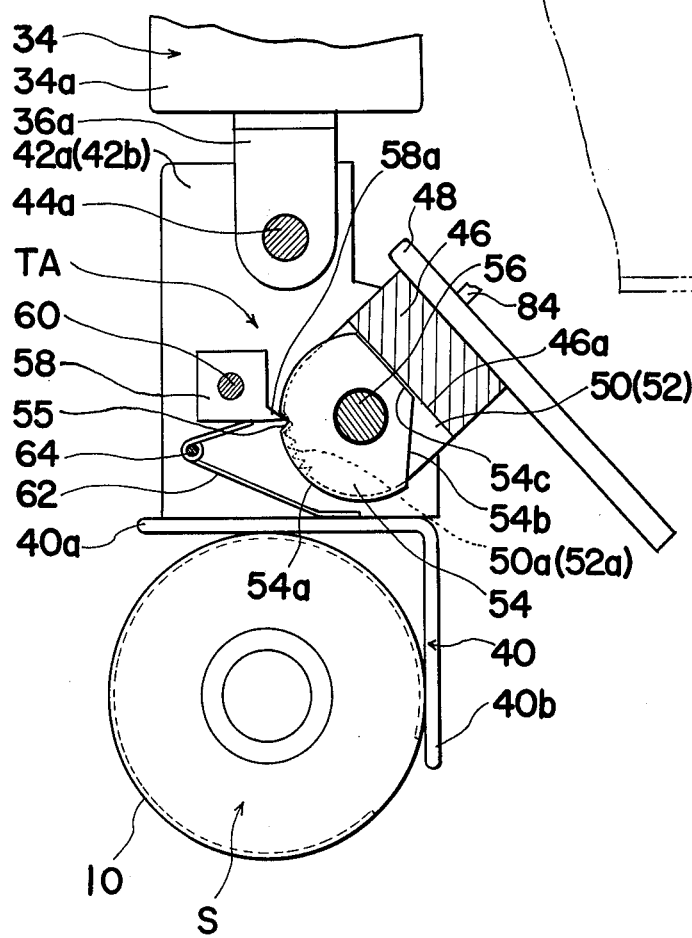
FIGS. 9 to 11 are views similar to FIG. 6, showing the sequential operation of the clutch.

It is to be noted that the sawteeth 50a and 52a in cooperation with the latch engagement 58a of the latch member 58 provide a plurality of stop positions, including the vertically downwardly oriented position, for the pivotal movement of the tiltable plate 48, the number of said stop positions being equal to the number of the sawteeth of each series 50a or 52a. By way of example, if the number of the sawteeth of each series 50a or 52b is five and they are developed on the associated rounded end of the arm 50 or 52 over an angle of 45° with respect to the longitudinal axis of the shaft 56, the tiltable plate 48 can stepwisely be pivoted counterclockwise in increments of about 9° from the vertically downwardly oriented position as shown in FIG. 6 towards a maximum tilted position, as shown in FIG. 9, past the intermediate tilted positions. This means that the tiltable plate 48 and, therefore, the screen sheet 12 as will be described later, can be tilted up in increments of 9° from the vertically downwardly oriented position towards the maximum tilted position past the intermediate tilted positions.

FIG. 9 illustrates the condition in which the tiltable plate 48 has been tilted up to the maximum tilted position. As can be seen from FIG. 9, since the clutch plate 54 remains unrotated during the pivotal movement of the tiltable plate 48, the end face area 46a of the block 46, which has been held in contact with the flank 54b of the clutch plate 54 when the tiltable plate 48 is in the vertically downwardly oriented position as shown in FIG. 6, is brought into contact with the flank 54c.

Starting from the condition as shown in FIG. 9, further pivotal movement of the tiltable plate 48 in the counterclockwise direction about the common shaft 56, that is, further pivotal movement of the tiltable plate 48 past the maximum tilted position in a direction opposed to the vertically downward oriented position, forces the clutch plate 54 to rotate counterclockwise about the common shaft 56 with the flank 54c receiving the force so applied as to pivot the tiltable plate 48. The consequence is that, as best shown in FIG. 10, the latch member 58 remains rotated clockwise against the wire spring 62 on one hand and the latch engagement 58a escapes from the notch 55 in the clutch plate 54 and becomes held in engagement with the semi-circular peripheral face of that portion 54a of the clutch plate 54, thereby disengaging from the sawteeth 50a and 52a.

Figure 10:
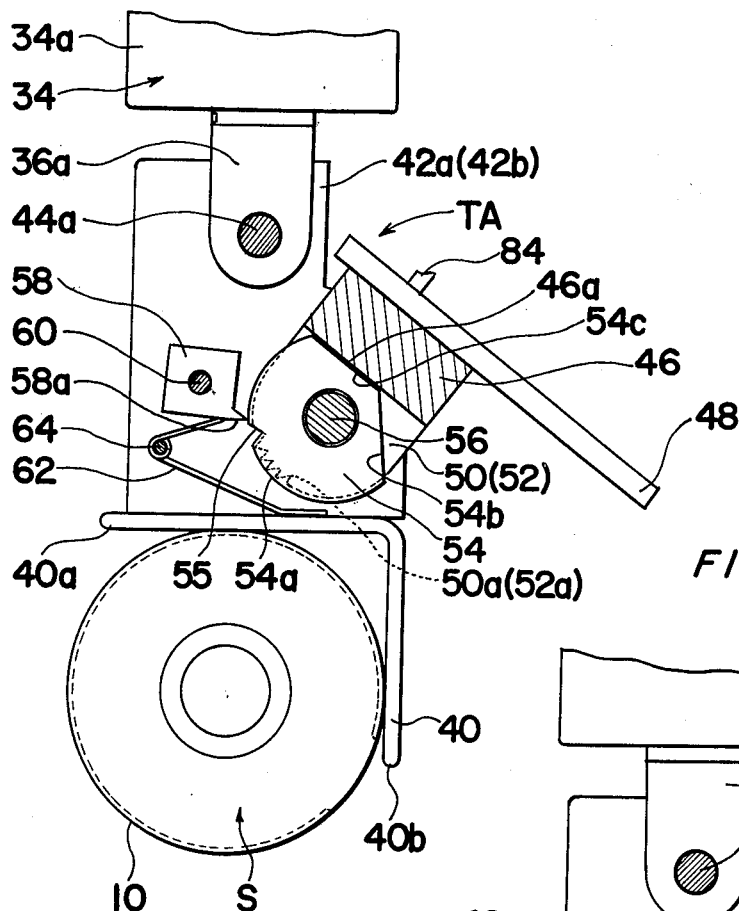

After the condition shown in FIG. 10 has been established and when the external pulling or pushing force, which has been transmitted to the tiltable plate 48 is removed, the tiltable plate 48 tends to return towards the vertically downwardly oriented position pivoting about the common shaft 56. During the return movement of the tiltable plate 48, the clutch plate 54 remains unrotated because the force of the wire spring 62 causes the latch engagement 58a to retain the clutch plate 54 in position. It is to be noted that, so long as the latch engagement 58a is held in engagement with the semi-circular free of that portion 54a of the clutch plate 54 substantially as shown in FIG. 10, the latch engagement 58a is clear of all of the sawteeth 50a and 52b and, therefore, does not provide any obstruction to the pivotal movement of the tiltable plate 48.

Figure 11:
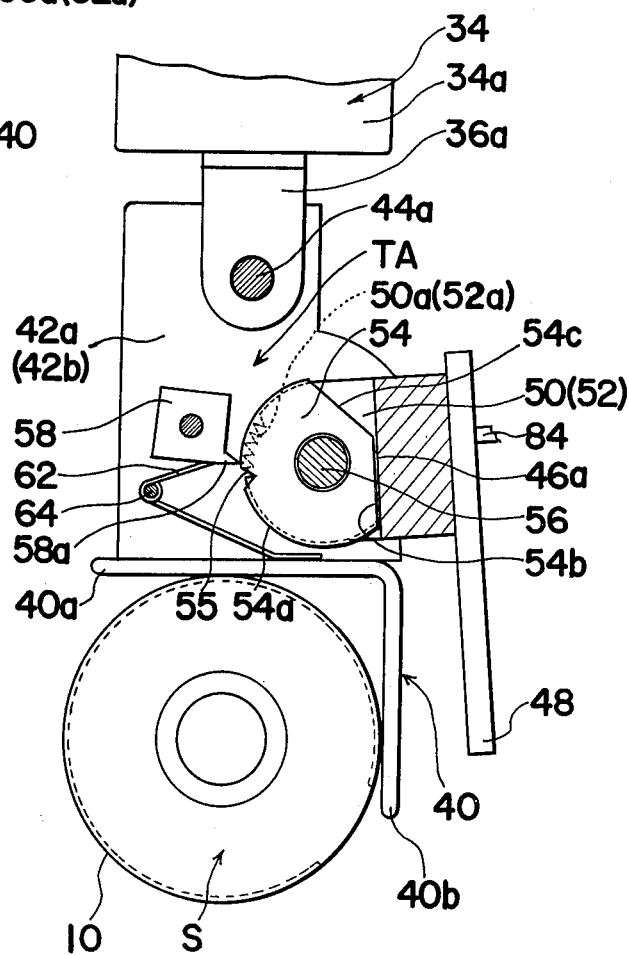

As the tiltable plate 48 during its return movement towards the vertically downwardly oriented position, approaches the vertically downwardly oriented position, the end face area 46a of the block 46 is again brought into contact with the flank 54b, as shown in FIG. 11, and subsequently forces the clutch plate 54 to rotate clockwise about the common shafts 56. Simultaneously with completion of the return movement of the tiltable plate 48, that is, arrival of the tiltable plate 48 at the vertically downwardly oriented position, the latch engagement 58a of the latch member 58 frictionally slides over the semi-circular peripheral face of that portion 54a of the clutch plate 54 and then slips into the notch 55, thereby establishing the initial condition shown in FIG. 6.

However, where the tiltable plate 48 is positioned at any one of the intermediate tilted positions between the vertically downwardly oriented position, as shown in FIG. 6, and the maximum tilted position as shown in FIG. 9, the return movement of the tiltable plate 48 can be effected only after the tiltable plate 48 has been pivoted counter-clockwise past the maximum tilted position substantially as shown in FIG. 10.

It is to be noted that, instead of the combination of the latch member 58 and the wire spring 62, the use of a leaf spring can be contemplated by those skilled in the art without any reduction occurring in performance of the tilt angle adjusting mechanism of the present invention.

The screen assembly according to my invention further comprises an articulated support bar SB, the construction of which will now be described with particular reference to FIGS. 1, 2, 6 and 8.

Referring to FIGS. 1, 2, 6 and 8, the articulated support bar SB comprises an upper support rod 66 of preferably substantially U-shaped cross section, having one end pivotally connected to the tiltable plate 48 by means of a bearing assembly BA having a construction which will be described later, and at the other end a pair of spaced lugs 66a which are respectively integral with the opposed side walls forming the U-sectioned support rod 66, and a lower support rod 68 of a length substantially equal to the length of the upper support rod 66 having one end inserted in between the lugs 66a and in turn pivotally coupled thereto by means of a connecting pin 70. Although not shown, the rotatable connection between the end of the lower support rod 68 and the connecting pin 70 which in turn connects the former to the upper support rod 66 by way of the lugs 66a is preferably effected by the use of any known roller bearing or ball bearing. The other end of the lower support rod 68 is shown to be pivotally connected to the frame rod 14 at an intermediate portion thereof as at 72. Preferably, the pivotal connection between the end of the lower support rod 68 and the frame rod 14 of the screen unit S is effected by way of a roller or ball bearing of any known construction.

As best shown in FIG. 6, the bearing assembly BA includes a roller bearing of a type having outer and inner races 74 and 75 with a plurality of rollers 76 rotatably disposed therebetween, said outer race 74 having a radially outwardly extending projection 74a which is connected to the first mentioned end of the upper support rod 66 by means of at least one set screw tapped into said projection 74a through one of the opposed side walls of the upper support rod 66 as shown. This roller bearing is secured to the tiltable plate 48 by means of a set bolt 78 extending through the inner race 75 and being tapped into the tiltable plate 48 while an axial thrust bearing, generally indicated by 80, is disposed between one of the opposed ends of the outer race 74 adjacent said plate 48 and said tiltable plate 48.

Although the employment of the bearing assembly SB including the roller bearing and the axial thrust bearing is advantageous for a smooth pivotal movement of the upper support rod 66, it may not be always necessary.

Figure 8:
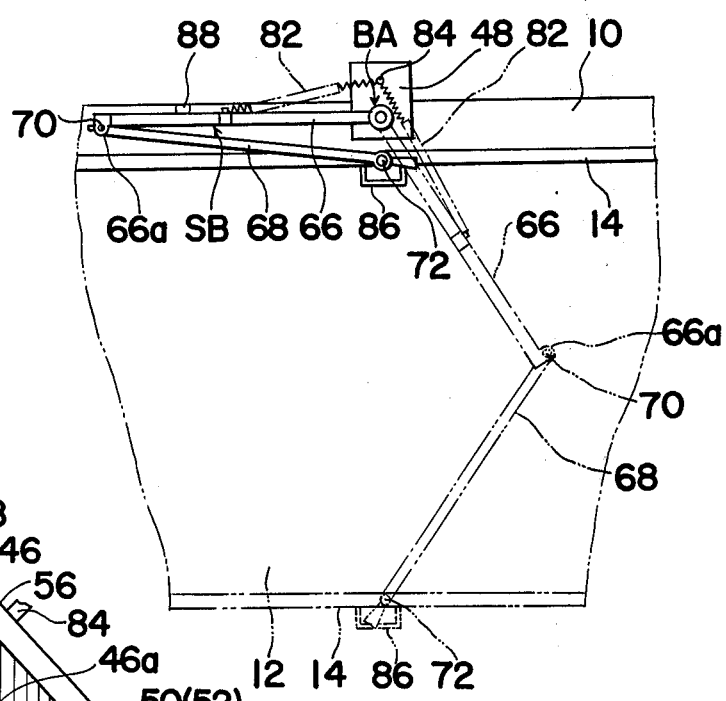
FIG. 8 is a rear elevational view of a portion of the screen assembly, showing the tiltable support bar in two different operative positions indicated respectively by the solid line and the chain line.

Referring particularly to FIG. 8, a tension spring 82 is connected between a substantially intermediate portion of the upper support rod 66 and a mounting pin member 84 rigidly secured to the tiltable plate 48 at a position substantially above the bearing assembly BA and extending at right angles to said tiltable plate 48. These upper and lower support rods 66 and 68 are, when the screen sheet 12 is retracted into the screen casing 10, folded with the mounting pin member 84 situated close to and immediately below the bearing assembly BA, as shown by the solid line in FIG. 8, by the combined action of the tension spring 82 and the force exerted by the screen winder (not shown) acting to wind the screen sheet 12 up around the winding spindle within the screen casing 10. On the other hand, as the screen sheet 12 is pulled outwards by the application of an external pulling force to a handle 86 secured to the frame rod 14 intermediately of the length of the frame rod 14 and, consequently, drawn out of the screen casing 10, the upper and lower support rods 66 and 68 pivot about the connecting pin 70 relative to each other against the tension spring 82 and then are brought into line with each other, at which time the screen sheet 12 is suspended in its fully stretched condition.

In the construction so far described, in order to keep the screen sheet 12 steadily in a stretched position, the upper and lower support rods 66 and 68 should, after having been brought into line with each other as described above, be bent at the pivotal connection therebetween, by the application of an external pushing force, so as to case the position of the connecting pin 70 to be situated on the side of a line opposite to the side on which the same connecting pin 70 is located when the support rods 66 and 68 are folded, as shown by the chain line in FIG. 8. In the condition shown by the chain line in FIG. 8, the upper and lower support rods 66 and 68 are retained in position as shown by the chain line because one end extremity of the bottom wall, which forms the U-sectioned upper support rod 66 together with the aforesaid side walls, serves as a stop engaged with the lower support rod 68, thereby preventing any possible further pivotal movement of the lower support rod clockwise about the connecting pin 70.

However, if the position of the mounting pin member 84 relative to the tiltable plate 48 is, with respect to the imagninary line passing through the bearing assembly BA and the pivot 72, displaced a slight distance to one side opposed to the side where the folded support rods 66 and 68 are situated, the condition shown by the chain line in FIG. 8 can automatically be established without the external pushing force being applied to the portion of the support bar adjacent the connecting pin 70.

As best shown in FIGS. 1 and 8, in order to define the folded position for the upper and lower support rods 66 and 68, a stop 86 may be mounted rigidly on the screen casing 10, against which stop 86 a substantially intermediate portion of the upper support rod 66 abuts when the upper and lower support rods 66 and 68 are folded as shown by the solid line in FIG. 8.

Hereinafter, the manner in which the screen sheet 12 is tilted will be described.

Assuming that the screen sheet 12 has been drawn out of the screen casing 10 to the stretched position as shown in FIG. 1 and that the tiltable plate 48 is positioned at the vertically downwardly oriented position as clearly shown in FIG. 6, the screen sheet 12 is in position parallel to the vertical datum along which the force of gravity acts downwards, as shown by the chain line in FIG. 2. When the external pushing or pulling force applied to the handle 86 is transmitted to the tiltable plate 48 by way of the articulated support bar SB, the screen sheet 12 can be backwardly tilted substantially pivoting about the screen casing 10 with the tiltable plate 48 pivoting about the common shaft 56 from the vertically downwardly oriented position towards the maximum tilted position as shown in FIG. 9. During the pivotal movement of the tiltable plate 48 from the velocity downwardly oriented position towards the maximum tilted position, and tiltable plate 48 can be held in any one of the intermediate positions between the vertically downwardly oriented position and the maximum tilted position as desired and, consequently, the angle of tilt of the screen sheet 12 can be adjusted as desired substantially as shown by the solid line in FIG. 2. Specifically, at any one of the intermediate positions of the tiltable plate 48, the latch engagement 58a of the latch member 58 is still engaged in the notch 55 in the clutch plate 54 on one hand and is, on the other hand, substantially 'wedged' against the corresponding ones of the sawteeth 50a and 52a on the respective rounded ends of the arms 50 and 52, thereby locking the tiltable plate at said one of the intermediate positions.

Return of the tiltable plate 48 to the vertically downwardly oriented position can be effected in the manner as hereinbefore described in connection with the operation of the tilt angle angle adjusting mechanism TA.

On the other hand, wherever the tiltable plate 48 is positioned, the screen sheet 12 in the stretched position can automatically be retracted into the screen casing 10 if, as viewed from FIG. 1, the pivotal connection between the upper and lower support rods 66 and 68 is brought to the other side with respect to the imaginary center line passing through the pivot 72 and the bearing assembly BA by the application of an external force thereto. However, this is preferably effected after the screen sheet 12 has been returned to the position as indicated by the chain line in FIG. 2 with the tiltable plate 48 returned to the vertically downwardly oriented position.

Although the present invention has fully been described in connection with the preferred embodiment thereof, it is to be noted that various changes and modifications will be apparent to those skilled in the art. By way of example, the bearing assembly BA may not be always necessary. In this case, a simple pivotal connection of the upper support rod 66 to the tiltable plate 48 merely by the use of a connecting pin member which may extend through the upper support rod 66 and be in turn tapped or secured to the tiltable plate 48 may be sufficient. In addition, the block 34 may have a construction composed of block halves and, in such case, the projection 36a may be integral with or welded to the upright frame members 42a and 52b.

Furthermore, if the are of the end face of the block 46 is sufficiently large to support the upper support rod 66 which is pivotally connected thereto, the tiltable plate 48 may be omitted.

Moreover, although the screen casing 10 has been shown and described as having a circular cross sectional shape, it may have any polygonal cross sectional shape, for example, square. If the screen casing 10 is of square cross sectional shape, the L-shaped bracket 40 may be omitted.

Yet, although the screen casing 10 has been described as rigidly secured to the L-shaped bracket 40, it may not be always necessary. If the L-shaped bracket 40 is provided with a hook member, any other conventional screen unit of a type similar to that described can be connected to the screen suspending and tilting mechanism of the present invention merely by engaging an eyelet on the screen casing to the hook member.

Therefore, these changes and modifications are to be understood as included within the true scope of the present invention, unless they depart therefrom.

What I claim is:

1. A screen assembly which comprises in combination:
    a screen unit including a hollow screen casing, having a winding spindle coaxially housed within the screen casing and a screen winder operatively associated with the winding spindle, and a screen sheet having one end rigidly secured to the winding spindle within the screen casing and the other end situated outside the screen casing and a frame rod to which said other end is secured;
    means for suspending the screen unit from an overhead support structure;
    means including first and second upright frame members for connecting said screen unit to said suspending means, said first and second upright frame members being spaced from each other to define an accommodation space therebetween;
    a tilt angle adjusting mechanism including a tiltable member and operatively accommodated within said accommodation space for adjustably tilting said tiltable member from an initial position to a maximum tilted position through one or more intermediate tilted positions, said mechanism having a plate means integrally formed with the tiltable member, the plates means having a semi-circular periphery with a plurality of sawteeth thereon equal in number to the number of positions of the tiltable member including the initial position, intermediate tilted positions and the maximum tilted position, a clutch plate of substantially segmental shape having an arcuate peripheral portion and a pair of flanks and including a notch in the arcuate peripheral portion of the clutch plate, and a latch element pivotally supported in position between the first and second upright frame members and urged in one direction, a common shaft on which the plate means and the clutch plate are pivotally mounted, said shaft being mounted between the first and second upright frame members with the arcuate peripheral portion of the clutch plate projecting slightly outwardly from the semicircular periphery of the plate means, the flanks of the clutch plate substantially facing the tiltable member and adapted to receive alternately an external pushing force from the tiltable member, the latch element being positioned for remaining engaged in the notch in the clutch plate during the pivotal movement of the tiltable member from the initial position to the maximum tilted position past the intermediate tilted positions riding over the sawteeth in the plate means with one of the flanks receiving the force from the tiltable member pivoting towards the maximum tilted position and, during return of the tiltable member back towards the initial position, the latch element being disengaged from the notch in the clutch plate and the other of the flanks receives the force from the tiltable member then pivoting towards the initial position, the return of the tiltable member back towards the initial position being initiated after the tiltable member is further pivoted beyond the maximum tilted position;
    a tiltable support bar means including first and second straight sections articulated to each other, one end of the first section remote from the second section being pivotally connected to said tiltable member and one end of the second section remote from the first section being pivotally connected to the frame rod at a position substantially intermediate of the length of the frame rod, said first and second sections of the tiltable support bar means being folded close to each other when and so long as the screen sheet is not drawn out of the screen casing to a stretched position, and being brought into substantial alignment with each other when and so long as the screen sheet is drawn out of the screen casing to the stretched position, said tiltable support bar means being tiltable together with the tiltable member for corresponding tilting the screen sheet substantially about the screen casing, the screen sheet when the tiltable member is in the initial position being in a plane perpendicular to the horizontal datum.

2. A screen assembly as claimed in claim 1, further comprising a spring element connected between a portion of the tiltable member and a substantially intermediate portion of the first section of the tiltable support bar means for exerting an additional force on the tiltable support bar means for automatically folding the first and second sections close to each other as the screen sheet once drawn out of the screen casing is retracted into the screen casing by the action of the screen winder.

3. A screen assembly as claimed in claim 1, wherein the suspending means comprises a supporting column having one end adapted to be secured to the overhead support structure and a rotary joint assembly connected in position between the other end of the supporting rod and the upright frame members for enabling the screen unit to be rotated about the longitudinal axis of the supporting rod.

4. A screen assembly as claimed 3, wherein the supporting column is constituted by a first tube member having one end adapted to be secured to the overhead support structure and a second tube member telescopically adjustably inserted into said first tube member, said second tube member having the end opposed to the end inserted into said first tube member coupled to said rotary joint assembly.

5. A screen assembly as claimed in claim 3, wherein the supporting column is constituted by a first tube member having one end adapted to be secured to the overhead support structure and a second tube member telescopically adjustably inserted into the first tube member, the second tube member having the end opposed to the end inserted into the first tube member coupled to the rotary joint assembly.

* * * * *